INVENTOR.
ARTHUR C. PARKS
BY
HIS ATTORNEY

United States Patent Office 3,072,413
Patented Jan. 8, 1963

3,072,413
SHAFT ASSEMBLY
Arthur C. Parks, Saint Catharines, Ontario, Canada, assignor to General Motors Corporation, Detroit, Mich., a corporation of Delaware
Filed Apr. 15, 1960, Ser. No. 22,463
2 Claims. (Cl. 277—8)

This invention relates to a shaft assembly, and, more particularly to a structure whereby protective seal life is enhanced in a location subject to relative rotation of parts.

An object of this invention is to provide a new and improved shaft and seal structure economical to produce yet having increased resistance to wear and leakage between components thereof.

Another object of this invention is to provide a rotatable member with an annular band of coextensive plastic material such as nylon, Teflon, Delrin and the like secured as a sealing surface directly to the rotatable member and radially in alignment with a stationary seal suitably mounted relative to a nonrotatable housing such that a nonrotatable lip portion of the seal is resiliently engageable directly against the band on the rotatable member.

Still a further object of this invention is to provide in combination a rotatable member having an annular peripheral portion including a coextensive band of wear-resistant resin material such as nylon as well as Teflon bonded, coated and the like directly onto the rotatable member along the peripheral portion and sealingly engageable by a nonrotatable sealing lip portion of seal means carried by a stationary housing.

Another object of this invention is to provide a universal joint assembly for use on a motor vehicle and having a propeller shaft provided with an externally splined end onto which a propeller shaft pinion is adapted to fit with a mating internally-splined portion located radially inwardly from an annular-splined portion located radially inwardly from an annular peripheral portion integral with the pinion and having a recess therein filled with a continuous band of plastic resin material secured by bonding, coating and the like thereto and engageable by a nonrotatable sealing lip portion resiliently urged radially inwardly onto the band of resin material and fitted into a stationary housing in a location adjacent to bearing means to provide journalling support between the shaft and housing.

Further objects and advantages of the present invention will be apparent from the following description, reference being had to the accompanying drawings wherein a preferred embodiment of the present invention is clearly shown.

Figure 1:
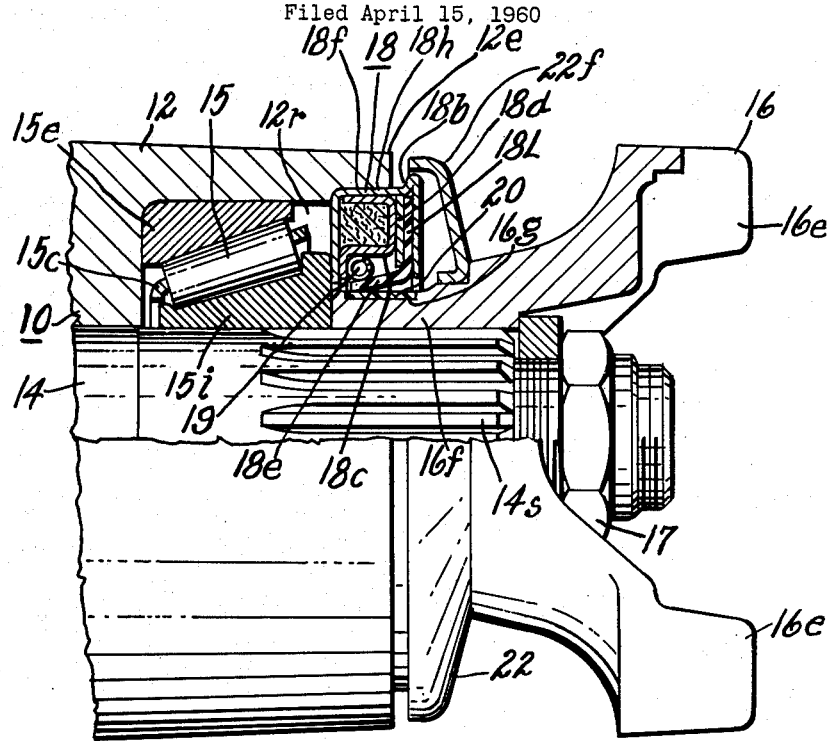
FIGURE 1 is a fragmentary, partially sectioned elevational view of a shaft assembly in accordance with the present invention.

In FIGURE 1 there is shown a shaft assembly generally indicated by numeral 10 including structure such as found on a motor vehicle. The assembly includes a stationary housing 12 which can be mounted or formed integrally with a nonrotatable component of a motor vehicle. The housing 12 includes a recess 12r defined by an inner peripheral surface of the housing 12 as well as an outer periphery of a rotating part such as a propeller shaft 14 and the like. Between the housing 12 and shaft 14, there is a bearing means 15 adapted to journal the shaft relative to the housing by means of an inner raceway 15i and an external raceway 15e between which suitable balls or rollers as bearing means can be provided and retained by a cage such as 15c, and the like. The shaft 14 includes an externally splined end portion 14s adapted to mate with internal splines 16s of a rotatable member 16 such as a propeller shaft pinion adapted to form part of a universal joint assembly with respect to an end portion 16e thereof in a well-known manner.

Figure 2:
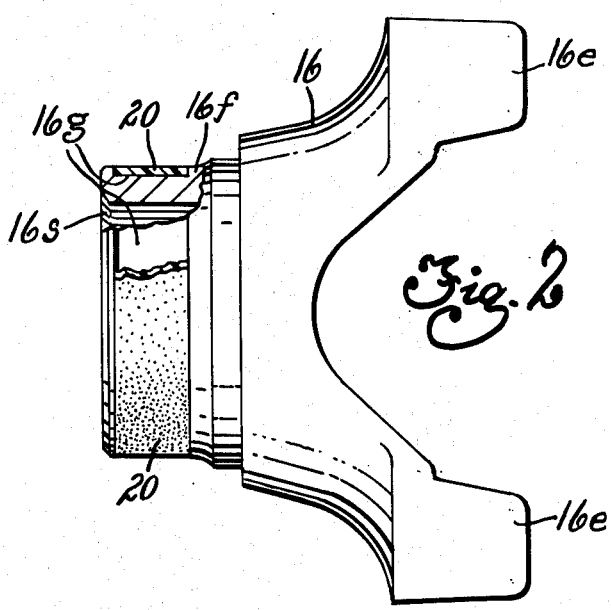
FIGURE 2 is a partially sectioned elevational view of a rotatable member and band of resin material thereon for use in the assembly of FIGURE 1.

FIGURES 1 and 2 illustrate the rotatable member 16 having an annular peripheral portion or flange 16f formed integrally therewith in a location radially outwardly from the splines 16s and axially to one side of the end portion 16e of the pinion. The pinion can be held in engagement with the splined end of the shaft 14 by means of a suitable fastening means such as a nut 17. The annular peripheral portion 16f has a groove 16g extending radially inwardly thereof in a location radially in alignment between the internal splines 16s and a nonrotatable seal means generally indicated by numeral 18 and having components as illustrated in a cross sectioned view of FIGURE 1. The seal means 18 has an outer annular housing member 18h provided with a flange portion 18f press fitted or locked into engagement with an inner periphery of an end 12e of the stationary housing 12. An annular backing disc 18d engages a radially outwardly extending portion or segment of a sealing lip portion 18L made of a flexible material such as leather, natural rubber, synthetic rubber-like material including neoprene and the like annular in shape and having a substantially axially extending portion resiliently backed by a garter spring 19 that urges an inner peripheral end 18e of the sealing lip portion 18L into engagement with an annular band of coextensive plastic material generally indicated by numeral 20 in FIGURES 1 and 2. This band 20 of coextensive plastic material such as nylon, Teflon, Delrin and the like is carried directly by the rotatable member 16 and the like so as to be radially in alignment with the sealing lip portion 18L in a predetermined location.

It is to be noted that the garter spring 19 or means resiliently urging the sealing lip portion 18L radially inwardly are retained by a cup member 18c adapted to be held or press fitted against the disc 18d to hold the radially extending portion of the sealing lip 18L in place relative to the housing 18h in a well-known manner. Preferably, the sealing means 18 is adapted to abut against a raceway such as 15i of the bearing means 15 that provide journalling support between the shaft 14 and housing 12.

The band 20 in effect is a sleeve rotatable with respect to a seal means such as 18. Use of a wear-resistant plastic material such as nylon, Teflon, Delrin and the like improves the seal life of the sealing lip portion 18L and also assures against undesirable deformation or wearing of the rotatable member such as the annular peripheral portion or flange 16f due to rubbing engagement thereof by a sealing lip portion such as 18L. The band or sleeve 20 preferably is tightly mounted on the rotatable member and is bonded, coated or cemented thereto. This bonding or coating occurs relative to the groove 16g that also serves to hold the band or sleeve in place in addition to bonding or cementing of the band relative to the rotatable member that is made of a suitable metal material.

An additional shield against dust and dirt can be provided in the form of an annular collar 22 adapted to be press fitted onto an outer periphery of the rotatable member 16 and movable therewith. The collar 22 includes an axially extending flange portion 22f having a radially outer edge terminating laterally in alignment with an outer bend 18b of the housing 18h of seal means 18. Thus, both the band or sleeve 20 and collar 22 are rotatable together with the member 16 with the band being adapted to contact a sealing lip portion of a stationary seal means such as 18. It is to be understood that the band can be formed by directly coating a wear resistant plastic material onto a peripheral surface of the rotatable member in combination with a stationary sealing means to provide an assembly in accordance with the present invention. Teflon can be identified as a fluorinated or fluorine containing synthetic resin material as for example, polytetrafluoroethylene and the like that can be bonded or cemented to a backing metal member in accordance with the teaching of Patent 2,809,130, Rappaport, issued October 8, 1957, and belonging to the assignee of the present invention. Nylon is a synthetically manufactured fiber in which the fiber-forming substance is any long chain synthetic polyamide having recurring amide groups as an integral part of the polymer chain. Patents 2,071,250, Carothers, 2,071,251, Carothers, and other disclosures belonging to DuPont set forth various suitable compositions of resin materials to illustrate compositions of nylon. Delrin is an acetal resin also commercially available from DuPont. Further suitable plastic materials having high resistance to heat and wear can also be provided as the band or sleeve 20 carried by the rotatable member such as 16. DuPont Patent 2,682,532, discloses a polyacetal preparation and other materials can also be used in a shaft assembly having a rotatable band relative to a stationary seal means in accordnce with the present invention.

While the embodiments of the present invention as herein disclosed constitute preferred forms, it is to be understood that other forms might be adapted.

What is claimed is as follows:

1. In a universal joint assembly for use on a motor vehicle including a propeller shaft having longitudinally extending external splines adjacent to an end thereof, a stationary housing having a recess adjacent to which the external splines are located and project at least partially therein with the shaft journalled for rotation relative to bearing means mounted in the recess as well as a metal pinion means having a peripheral portion secured complementary though longitudinally alignable along the external splines of the shaft, a seal means consisting of, a non-rotatable resilient exclusively rubber-like annular lip portion held in a predetermined position on the stationary housing in a location radially outwardly from the peripheral portion of the metal pinion means in which a radially inwardly extending groove of predetermined axial length is provided substantially equal to corresponding length of said non-rotatable resilient exclusively rubber-like annular lip portion, and a coextensive band of plastic material such as nylon, Teflon, Delrin and the like secured as a substantial resinous sealing surface directly to the rotatable peripheral portion of the pinion means and substantially to fill the groove flush with said peripheral portion though precluding axial displacement of said plastic coextensive band in either of opposite directions yet subject to engagement exclusively by said rubber-like annular lip portion and sealing directly therebetween.

2. In a motor vehicle universal joint assembly including a propeller shaft having longitudinally extending external splines adjacent to an end thereof fitted complementary to a peripheral portion of a metal pinion means rotatably together supported by a stationary housing having fixed thereto a seal means in which there is a spring-biased lip portion exclusively of rubber-like material the life of which is to be enhanced and in which the improvement consists of a coextensive band of resinous plastic material purposely pre-coated onto the peripheral portion along a groove-like radial recess therein of predetermined depth and axial length substantially equal to corresponding length of said rubber-like lip portion to accommodate possible difference in axial positioning therebetween due to axial fit of the splined end and pinion means, said coextensive band of resinous plastic material being exclusively made of one of a group of materials including nylon, Teflon and Delrin secured as a sealing surface directly to the groove-like recess of the metal pinion peripheral portion and substantially to fill said groove-like recess flush with said peripheral portion which further assures positive retention of plastic band positioning against axial displacement therefrom in either direction though accommodating possible difference in axial positioning between said rubber-like lip portion and coextensive resinous plastic band in direct sealing engagement with each other exclusively for longer radial seal life.

References Cited in the file of this patent
UNITED STATES PATENTS

| | | |
|---|---|---|
| 2,631,071 | Alden | Mar. 10, 1953 |
| 2,932,535 | Peickii et al. | Apr. 12, 1960 |
| 2,990,220 | Malone | June 27, 1961 |